(12) United States Patent
Onouchi (10) Patent No.: US 6,418,132 B1
(45) Date of Patent: Jul. 9, 2002

(54) MULTI-DIRECTIONAL MULTIPLEX COMMUNICATION SYSTEM AND ISDN SERVICING METHOD THEREIN

(75) Inventor: Takakazu Onouchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/079,144

(22) Filed: May 15, 1998

(30) Foreign Application Priority Data

May 15, 1997 (JP) ............................................. 9-125109

(51) Int. Cl.⁷ ................................................. H04B 7/15
(52) U.S. Cl. ........................ 370/338; 370/329; 370/347; 370/431
(58) Field of Search ................................. 370/328, 329, 370/338, 347, 431, 437, 442, 458, 498, 524; 455/450, 452

(56) References Cited

U.S. PATENT DOCUMENTS

| | | | |
|---|---|---|---|
| 4,949,395 A | * 8/1990 | Rydbeck | 455/458 |
| 5,157,660 A | 10/1992 | Kuwahara et al. | 370/95.1 |
| 5,260,944 A | * 11/1993 | Tomabechi | 370/468 |
| 5,412,660 A | * 5/1995 | Chen et al. | 370/401 |
| 5,479,407 A | 12/1995 | Ko et al. | |
| 5,572,530 A | * 11/1996 | Chitre et al. | 370/401 |
| 5,815,816 A | * 9/1998 | Isumi | 455/458 |
| 6,081,536 A | * 6/2000 | Gorsuch et al. | 370/468 |
| 6,229,800 B1 | * 5/2001 | Thompson et al. | 370/347 |

FOREIGN PATENT DOCUMENTS

| | | |
|---|---|---|
| JP | 2-9295 | 1/1990 |
| JP | 2-34057 | 2/1990 |
| JP | 2-312413 | 12/1990 |
| JP | 2-312414 | 12/1990 |
| JP | 3-11831 | 1/1991 |
| JP | 3-109848 | 5/1991 |

OTHER PUBLICATIONS

Kato et al., A TDMA Satellite Communication System for ISDN Services, IEEE, vol. 10, No. 12, pp. 456–464, Feb. 1992.*

* cited by examiner

Primary Examiner—Wellington Chin
Assistant Examiner—Frank Duong
(74) Attorney, Agent, or Firm—Foley & Lardner (57) ABSTRACT

A multi-directional multiplex communication system includes a base station connected to an ISDN and substations having a plurality of terminals connected thereto and serving to communicate with the base station through radio channels. Each substation includes terminating circuits for terminating layer 1 and layer 2 between the circuits and the terminal. The base station includes terminating circuits and a channel control circuit. The terminating circuits terminate layer 1 and layer 2 between the circuits and the ISDN. The channel control circuit performs transmission channel assignment/release between the base station and the substation by the demand-assignment scheme in accordance with generation/end of a call.

9 Claims, 9 Drawing Sheets

FIG. 4 ORIGINATION SEQUENCE

MULTI-DIRECTIONAL MULTIPLEX COMMUNICATION SYSTEM AND ISDN SERVICING METHOD THEREIN

BACKGROUND OF THE INVENTION

The present invention relates to a multi-directional multiplex communication system and an ISDN (Integrated Service Digital Network) servicing method therein and, more particularly, to an ISDN servicing method applied to a demand-assignment line setting system in which a base station and substations, each having a layer 2 terminating function, provide communication lines based on an ISDN basic interface (2B+D) by using transmission channels assigned to the respective subscribers in accordance with the generation/end of calls.

Figure 9:
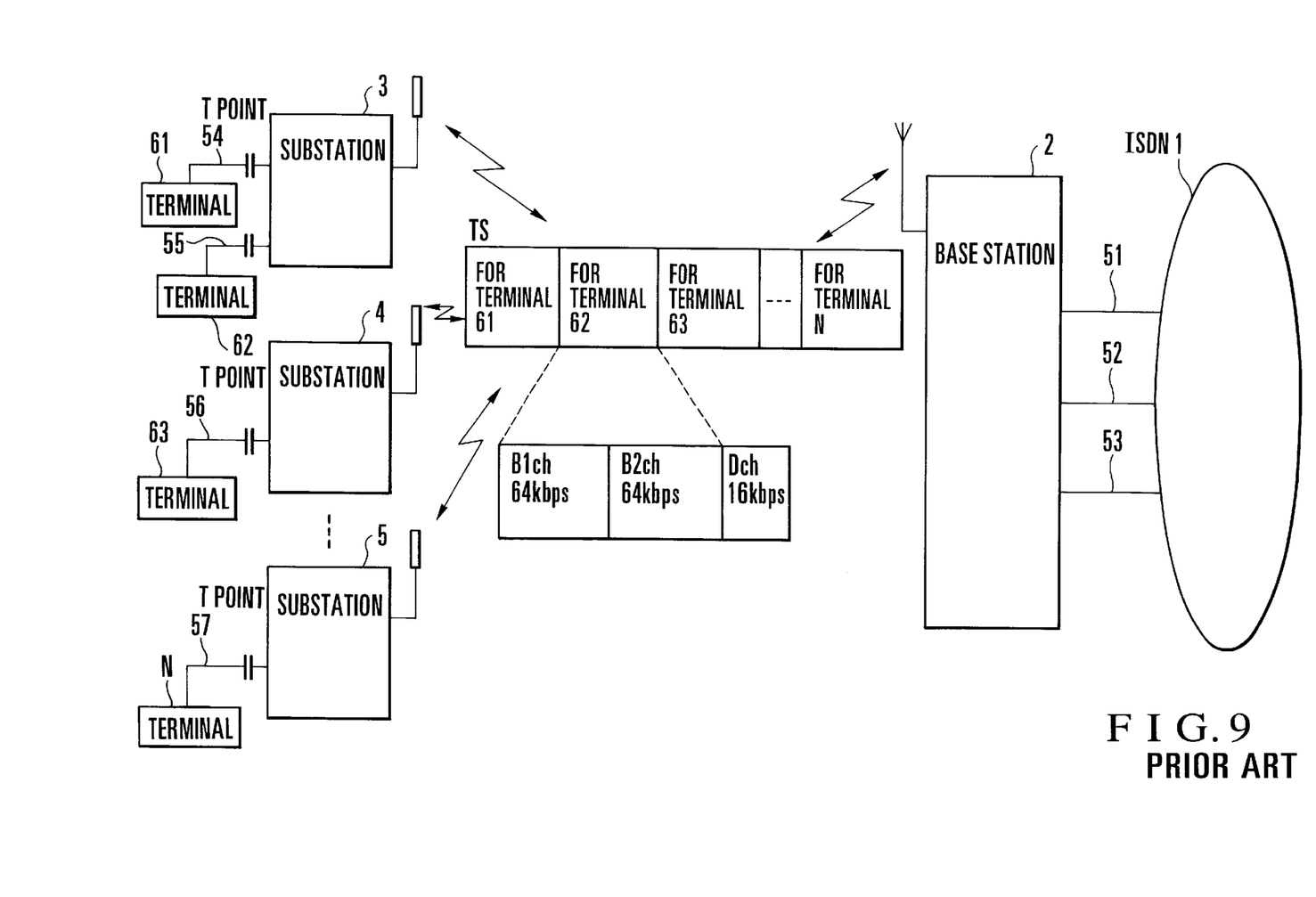
FIG. 9 is a block diagram for explaining an ISDN service in a conventional multi-directional multiplex communication system.

A conventional multi-directional multiplex communication system will be described with reference to FIG. 9. FIG. 9 shows the arrangement of a conventional multi-directional multiplex communication system for providing an ISDN basic interface. Referring to FIG. 9, communication lines are always assigned between substations 3, 4, and 5 and a base station 2 regardless of whether communication is performed. That is, a so-called pre-assign line setting scheme is used. The ISDN basic interface is an interface which has two B channels (64 kbps) and one D channel (16 kpbs) on one user/network interface and can be commonly used for various types of telephone/non-telephone services. In the conventional system, therefore, as shown in FIG. 9, communication lines equal in number to accommodated ISDN basic interfaces (N) are required between the base station and the substations.

According to the prior art, communication lines equal in number to accommodated ISDN interfaces are required between the base station and the substations, and the communication lines are always assigned even when no communication is performed. In addition, a user can use terminals such as a telephone set, a FAX unit, and a data terminal. It is expected that the traffic in using these terminals is smaller than that in using a leased line. For this reason, according to the conventional scheme of always assigning communication lines regardless of whether communication is performed, the number of subscribers accommodated is limited. It is therefore difficult to quickly cope with an increase in the number of subscribers. In addition, the communication line use efficiency becomes very low.

SUMMARY OF THE INVENTION

It is an object of the present invention to provide a multi-directional multiplex communication system which improves transmission efficiency by effectively using communication lines using a demand-assignment scheme of assigning communication lines in accordance with the generation of calls, and an ISDN servicing method in the system.

In order to achieve the above object, according to the present invention, there is provided a multi-directional multiplex communication system comprising a base station connected to an ISDN and at least one substation having a plurality of terminals connected thereto and serving to communicate with the base station through a radio channel, the substation including first layer terminating means for terminating layer 1 and layer 2 between the first layer terminating means and the terminal, and the base station including second layer terminating means for terminating layer 1 and layer 2 between the second layer terminating means and the ISDN, and channel control means for transmission channel assignment/release between the base station and the substation by a demand-assignment scheme in accordance with generation/end of a call.

DESCRIPTION OF THE PREFERRED EMBODIMENTS

The embodiments of the present invention will be described in detail below with reference to the accompanying drawings.

Figure 1:
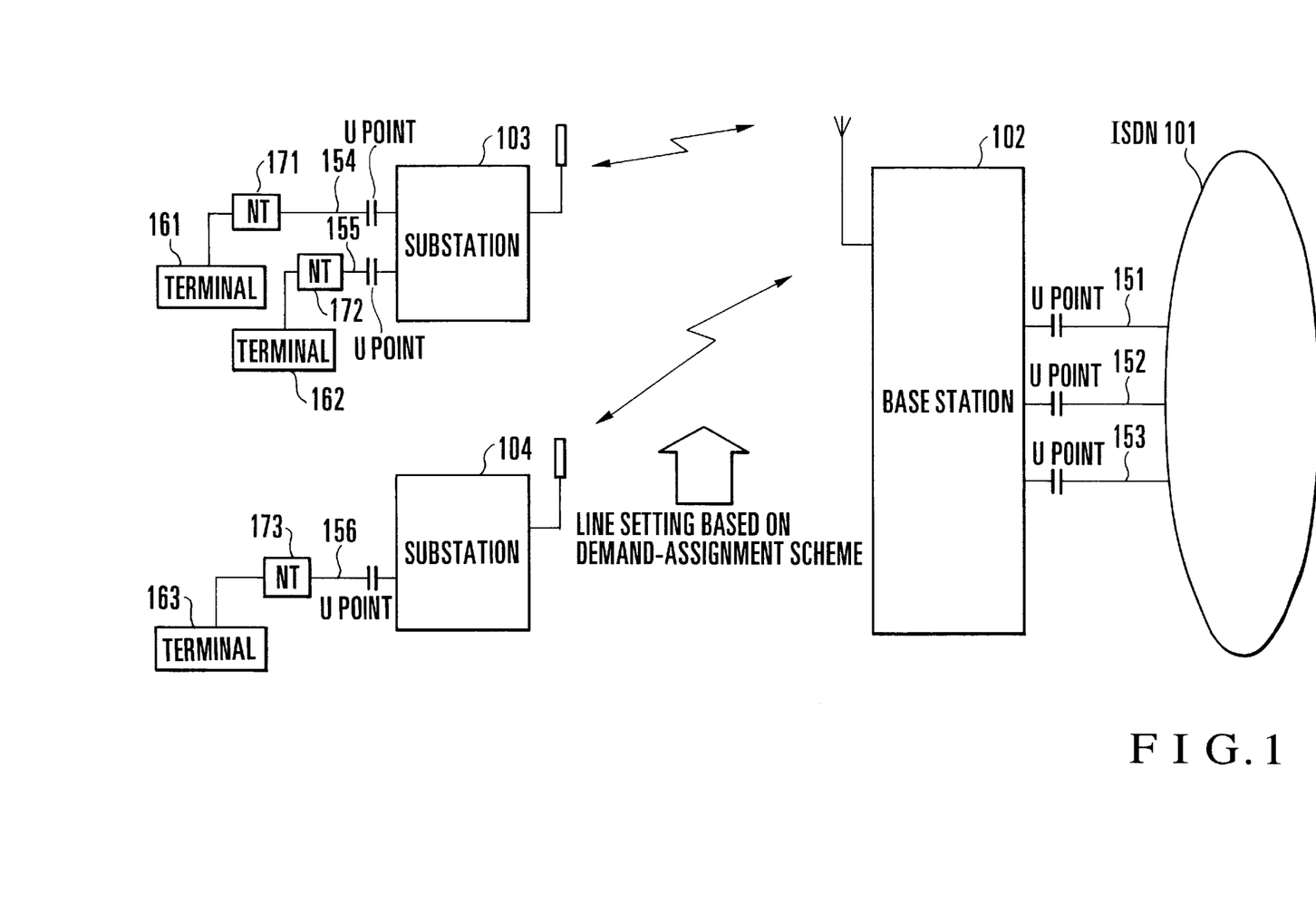
FIG. 1 is a block diagram showing the system configuration of a demand-assignment multi-directional multiplex communication system to which the present invention is applied.

FIG. 1 shows the schematic system configuration of a demand-assignment multi-directional multiplex communication system to which the present invention is applied. Referring to FIG. 1, lines 151, 152 and 153 of an ISDN 101 are connected to a base station 102. A substation 103 accommodates lines 154 and 155. A substation 104 accommodates a line 156. The lines 154, 155, and 156 respectively correspond to the lines 151, 152, and 153.

Communication lines are set between the substations 103 and 104 and the base station 102 by a demand-assignment line control scheme of assigning/releasing lines in accordance with the generation/end of calls. The number of communication lines (radio channels) between the base station 102 and the substations 103 and 104 can be smaller than the number of subscribers accommodated in this system. The substations 103 and 104 provide the U points of ISDN basic interfaces for network terminating units (NTs) 171, 172, and 173 accommodating terminals 161, 162, and 163.

Figure 2:
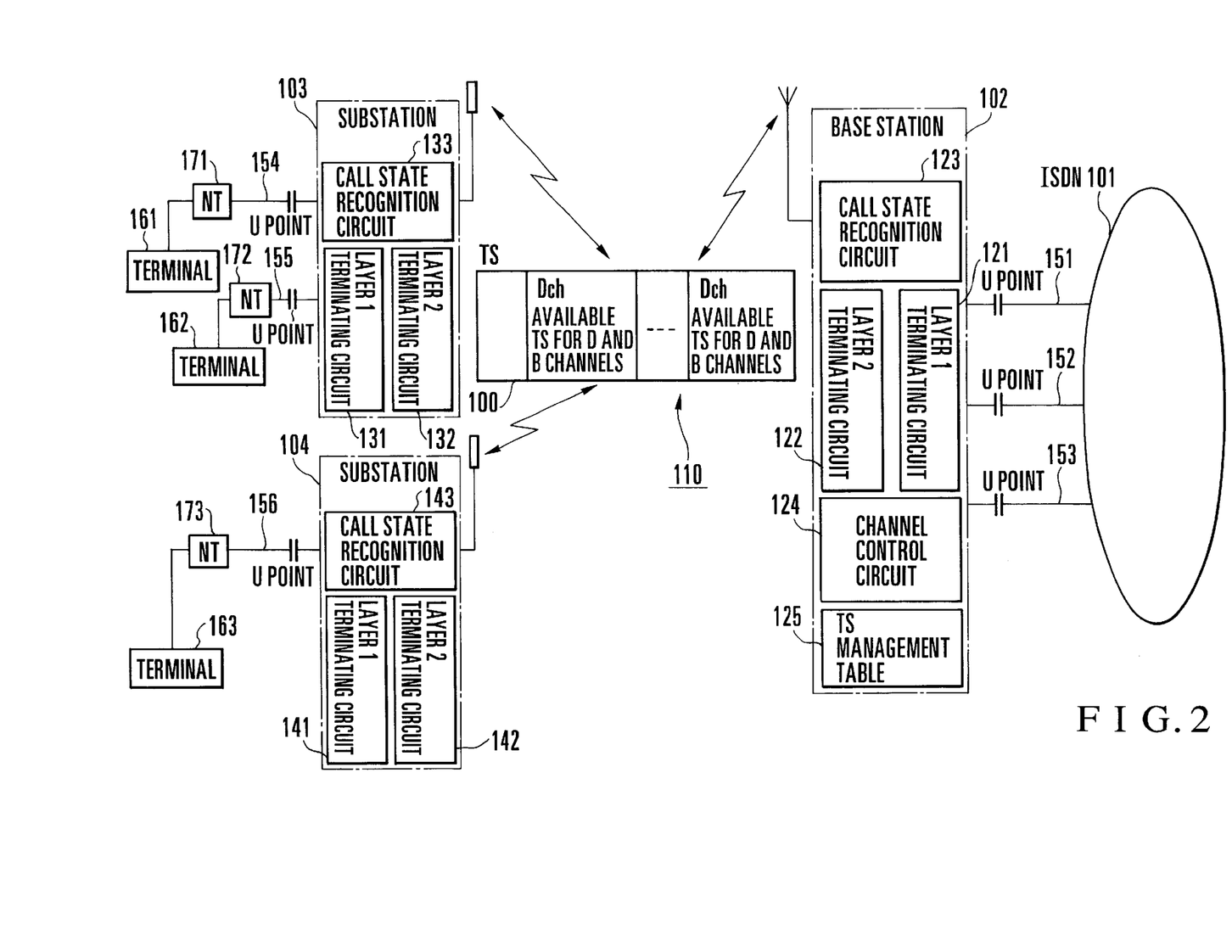
FIG. 2 is the system configuration of a multi-directional multiplex communication system according to the first embodiment of the present invention.

FIG. 2 shows the system configuration of a multi-directional multiplex communication system according to the first embodiment of the present invention. Referring to FIG. 2, basic interface lines 151, 152, and 153 from an ISDN 101 are accommodated in a base station 102. TDMA (Time Division Multiple Access) communication is performed between the base station 102 and substations 103 and 104. Communication between the base station 102 and the substations 103 and 104 is performed by the demand-assignment line control scheme of assigning/releasing TDMA time slots (TSs) to/from the D and B channels in accordance with the generation/end of calls.

Reference numeral 110 denotes the frame format of a signal transmitted/received between the base station 102 and the substations 103 and 104. In the frame format 110, a C channel 100 is a common control channel, which is used to exchange control information about TS assignment and D channel information of a basic interface between the base station 102 and the substations 103 and 104.

The base station 102 and the substations 103 and 104 respectively include layer 1 terminating circuits 121, 131, and 141 for terminating layer 1 and layer 2 terminating circuits 122, 132, and 142 for terminating layer 2. With this arrangement, layer 1 synchronization establishment and layer 2 link establishment can be independently performed between the base station 102 and the ISDN 101 and between the substations 103 and 104 and ISDN terminals 161, 162, and 163.

In addition, the base station 102 and the substations 103 and 104 respectively include call state recognition (detection) circuits 123, 133, and 143 each for monitoring a message on layer 2 or higher to recognize the generation/end of a call.

The layer 1 terminating circuits 121, 131, and 141 and the layer 2 terminating circuits 122, 132, and 142 are known circuits based on the ISDN communication scheme. These circuits can be easily realized by using LSIs (Large Scale Integrated Circuits) complying with the CCITT standards. Each of the substations 103 and 104 also has a C channel transmission/reception function (means) and the function (means) of transmitting/receiving voice and data with the time slots (TSs) designated by the base station 102. The interfaces between the substations 103 and 104 and the ISDN terminals 161, 162, and 163 and between the base station 102 and the ISDN 101 are the U points of ISDN basic interfaces.

The base station 102 has a channel control circuit 124 for managing time slots (TSs), in addition to a C channel transmission/reception function (means). The channel control circuit 124 assigns necessary time slots (TSs) to the D and B channels by looking up a TS management table 125 upon generation of a call. The basic interface lines 151, 152, and 153 corresponding to the ISDN terminals 161, 162, and 163 are accommodated in the base station 102.

The operation of the system having the above arrangement will be described in detail next with reference to the sequence diagrams of FIGS. 3 to 7.

A layer 2 link establishment sequence to be executed between the ISDN terminals 161, 162, and 163 accommodated in the substations 103 and 104 and the ISDN 101 connected to the base station 102 will be described below, together with sequences of operations to be performed when outgoing calls are generated from the ISDN terminals 161, 162, and 163 accommodated in the substations 103 and 104 after layer 2 link establishment, when incoming calls are received by the ISDN terminals 161, 162, and 163 accommodated in the substations 103 and 104, and when on-hook operation is performed.

(1) Layer 2 Link Establishment Sequence

Figure 3:
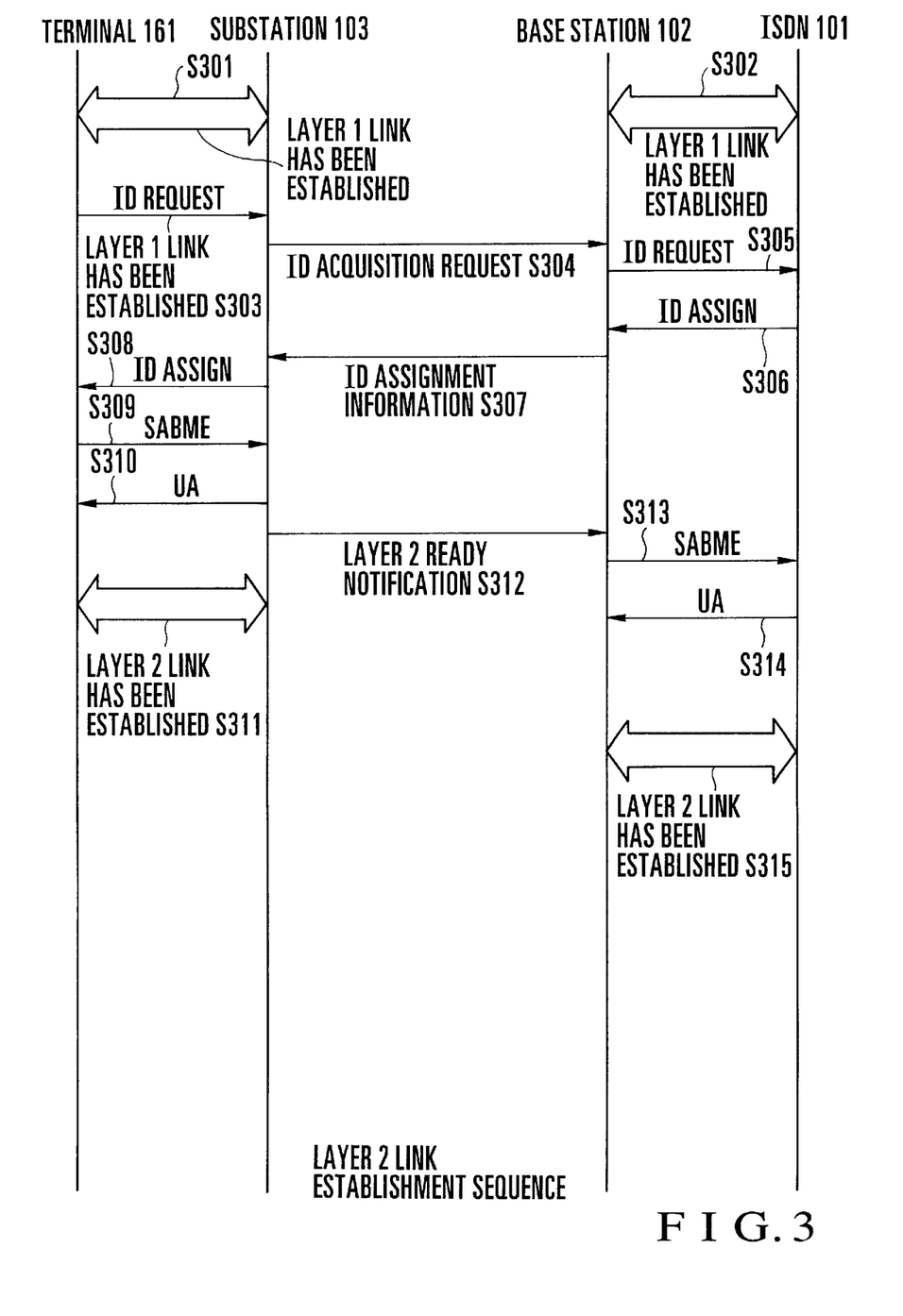
FIG. 3 is a sequence diagram showing a layer 2 link establishment sequence in the system shown in FIG. 2.

A sequence of operations from the supply of power to the terminal 161 accommodated in the substation 103 to the establishment of a layer 2 link will be described with reference to FIG. 3. In this case, the synchronization of layer 1 between the terminal 161 and the substation 103 is established by the function of the layer 1 terminating circuit 131 of the substation 103 (step S301). The synchronization of layer 1 between the base station 102 and the ISDN 101 is always established by the function of the layer 1 terminating circuit 121 (step S302).

When layer 1 synchronization is established, layer 2 messages can be transmitted/received between the terminal 161 and the substation 103 and between the base station 102 and the ISDN 101, and establishment of a layer 2 link is started from the terminal 161 side. First of all, the terminal 161 sends an ID (IDentifier) request (UI (Unnumbered Information) frame) message to the substation 103 to acquire an SAPI (Service Access Point Identifier) and a TEI (Terminal Endpoint Identifier) (step S303).

The substation 103 detects the ID request message from the terminal 161 through the layer 2 terminating circuit 132, and sends an ID acquisition request to the base station 102 by using the C channel 100 (step S304). This request is a message for acquiring the SAPI and the TEI for the terminal of the home station from the ISDN 101 through the base station 102.

Upon reception of the ID acquisition request from the substation 103, the base station 102 sends the ID request (UI frame) message to the ISDN 101 by using the line 151 for which layer 1 synchronization has already been established (step S305). In response to this message, an ID assignment (UI frame) message is returned from the ISDN 101 to the base station 102 (step S306). Upon reception of the ID assignment (UI frame) message, the base station 102 acquires the SAPI and the TEI for the terminal 161, and sends these pieces of information as ID assignment information to the substation 103 by using the C channel 100 (step S307).

Upon reception of the ID assignment information from the base station 102, the substation 103 sends the ID assignment (UI frame) message to the terminal 161 through the line 154 on the basis of the received ID assignment information (step S308). When the terminal 161 receives the ID assignment message, assignment of the SAPI and the TEI is complete. The terminal 161 then sends an SABME (Set Asynchronous Balanced Mode Extended) message for establishing a layer 2 link to the substation 103 (step S309). Upon reception of the SABME message from the terminal 161, the layer 2 terminating circuit 132 of the substation 103 returns UA (Unnumbered Acknowledge) to the terminal 161 (step S310). With this operation, a layer 2 link is established between the terminal 161 and the substation 103 (step S311).

Subsequently, the substation 103 notifies the base station 102 of the establishment of the layer 2 link between the terminal 161 and the substation 103 through the C channel 100 (step S312). The base station 102 transmits the SABME message to the ISDN 101 on the basis of the notification indicating that layer 2 is ready which is received from the substation 103 (step S313). The ISDN 101 returns UA to the base station 102 (step S314). With this operation, the layer 2 link between the base station 102 and the ISDN 101 is established, as in the case of the layer 2 link between the terminal 161 and the substation 103 (step S315).

The layer 2 links are respectively established between the terminal 161 and the substation 103 and between the base station 102 and the ISDN 101 by the above sequence. As a result, the terminal 161 can communicate with the ISDN 101 through the substation 103 and the base station 102. The SAPI, the TEI, the ID request, the ID assignment message, the SABME message, and UA are known terms and signal names in the ISDN communication scheme and included in the layer 2 state.

(2) Origination Sequence

Figure 4:
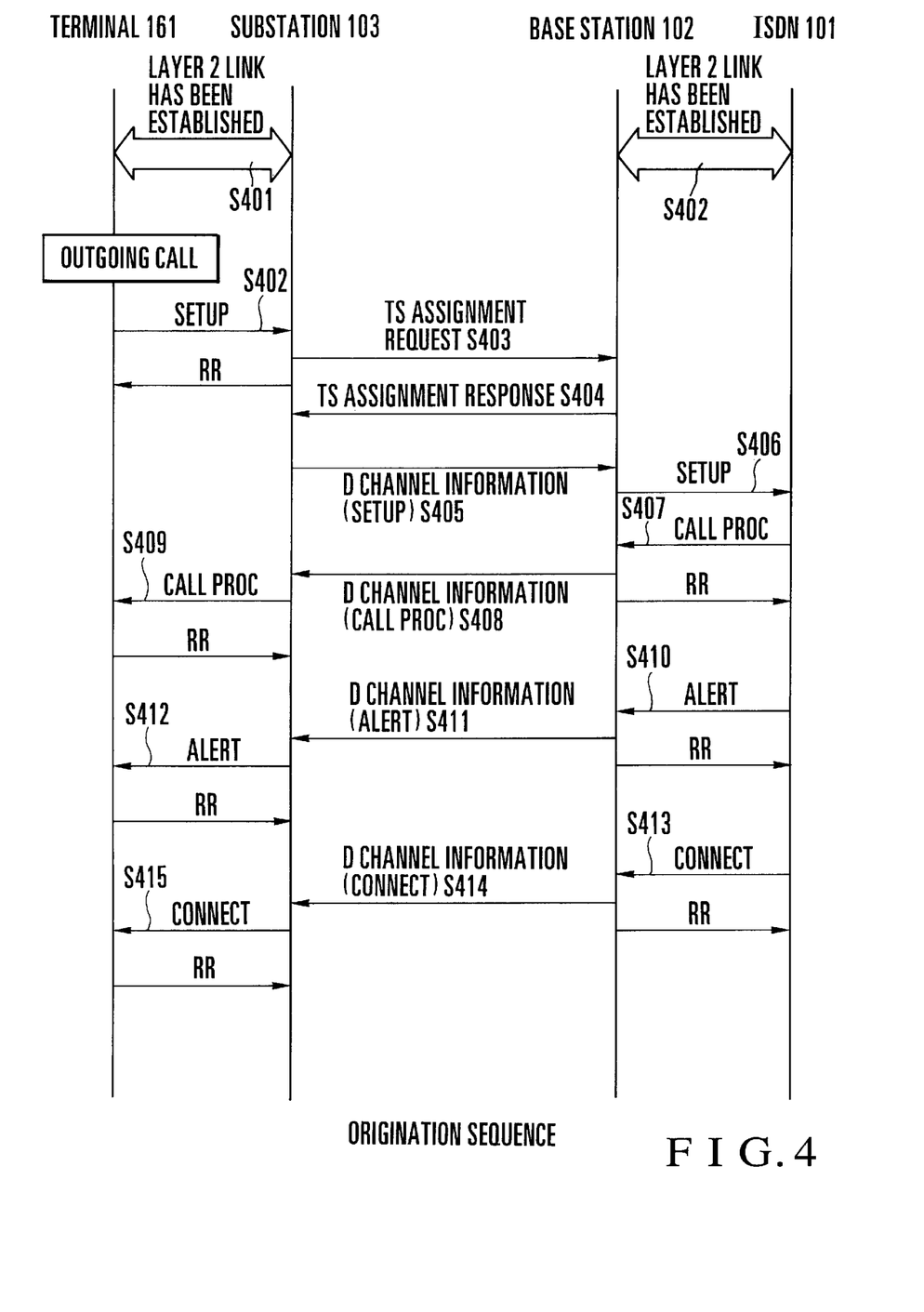
FIG. 4 is a sequence diagram showing line connection upon origination from the terminal side in the system shown in FIG. 2.

A sequence to be executed when the terminal 161 accommodated in the substation 103 generates an outgoing call will be described with reference to FIG. 4. The layer 2 links have already been established between the terminal 161 and the substation 103 and between the base station 102 and the ISDN 101 by layer link establishment sequence (1) (steps S401 and S402). When the terminal 161 generates an outgoing call, the terminal 161 sends a SETUP (I frame) message to the substation 103 (step S402). This message is a layer 3 message for notifying origination.

The call state recognition circuit 133 of the substation 103 detects the SETUP message from the terminal 161 by using the layer 3 message monitor function, and sends a TS assignment request to the base station 102 by using the C channel 100 (step S403). This request is a message for requesting assignment of a B channel time slot to the terminal accommodated in the home station. This message contains the ID of the substation 103 and the SAPI and the TEI acquired upon establishment of the layer 2 link. In addition, the substation 103 checks the number of TSs to be requested on the basis of the information in the SETUP message, and adds the resultant information to the TS assignment request. Note that RR represents "Receive Ready".

Upon reception of the TS assignment request from the substation 103, the channel control circuit 124 in the base station 102 looks up the TS management table 125 and adds TS numbers corresponding to the required number of TSs to a TS assignment response, and transmits it to the substation 103 (step S404). That is, a C channel frame containing the ID of the substation 103, the SAPI, the TEI and the TS numbers is transmitted.

When the substation 103 receives the TS assignment message from the base station 102, D and B channel time slots (TSs) to be used between the ISDN 101 and the terminal 161 are established. Subsequently, the substation 103 transmits the SETUP message, received from the terminal 161, to the base station 102 through the D channel time slot (TS) (step S405).

In this case, as the protocol between the substation 103 and the base station 102, a conventional protocol can be used even if it does not comply with the ISDN standards. The D channel message which the substation 103 has received from the terminal 161 is converted into a message to be transmitted between the substation 103 and the base station 102 and transmitted as D channel information message to the base station 102.

The base station 102 re-converts the received D channel information into the SETUP message, and transmits it to the ISDN 101 (step S406). Subsequently, the layer 3 messages (CALL PROC, ALERT, CONNECT) sequentially output from the ISDN 101 to the base station 102 are frame-relayed through the D channel time slot (TS) (steps S408, S411, and S414) and transmitted to the terminal 161 (steps S407 and S408, S410 to S412, and S413 to S415). As a result, origination is complete.

(3) Termination Sequence

Figure 5:
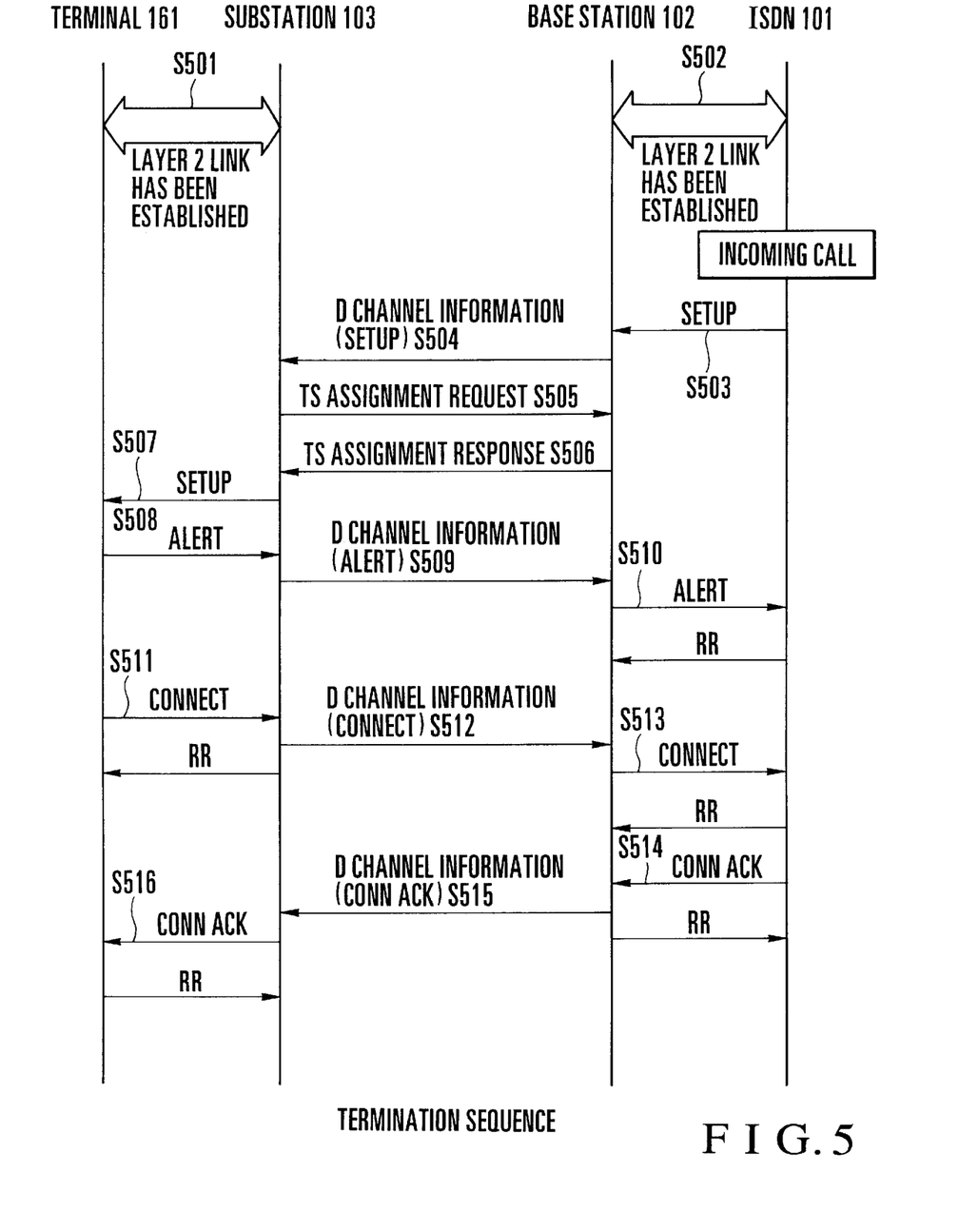
FIG. 5 is a sequence diagram showing line connection upon termination from the ISDN side in the system shown in FIG. 2.

A sequence to be executed when an incoming call is received by the terminal 161 accommodated in the substation 103 will be described with reference to FIG. 5. The layer 2 links have already been established between the terminal 161 and the substation 103 and between the base station 102 and the ISDN 101 by layer link establishment sequence (1) (steps S501 and S502). When an incoming call is generated, a SETUP message is sent from the ISDN 101 to the base station 102 through the line 151 corresponding to the terminal 161 (step S503). This message is a layer 3 message indicating the reception of an incoming call from the ISDN 101 side.

The base station 102 detects the SETUP message from the ISDN 101 through the call state recognition circuit 123, and converts it into a message to be transmitted between the substation and the base station. The base station 102 then transmits the message as a D channel information message to the substation 103 through the C channel 100 (step S504). Upon detecting the SETUP message in the D channel information message, the substation 103 sends a TS assignment request to the base station 102 to request assignment of D and B channel TSs, as in the case of origination (step S105). This message contains the SAPI, the TEI, and the required number of TSs read from the SETUP message, as in the case of origination.

Upon reception of the TS assignment request from the substation 103, the channel control circuit 124 in the base station 102 looks up the TS management table 125 to add the TS numbers of the TSs to be assigned to a TS assignment response, and transmits it to the substation 103 (step S506). When the substation 103 receives the TS assignment response from the base station 102, the time slots (TSs) to be used between the ISDN 101 and the terminal 161 are established. The substation 103 re-converts the received D channel information into the SETUP message, and transmits it to the terminal 161 (step S507).

Subsequently, the layer 3 messages (ALERT, CONNECT) transmitted from the terminal 161 to the substation 103 and the layer 3 message (CONN ACK) transmitted from the ISDN 101 to the base station 102 are transferred to the ISDN 101 and the terminal 161 by frame relay through the assigned D channel time slots (TSs) (steps S508 to S510, S511 to S513, and S514 to S516). As a result, termination is complete.

(4) On-hook Sequence

Figure 6:
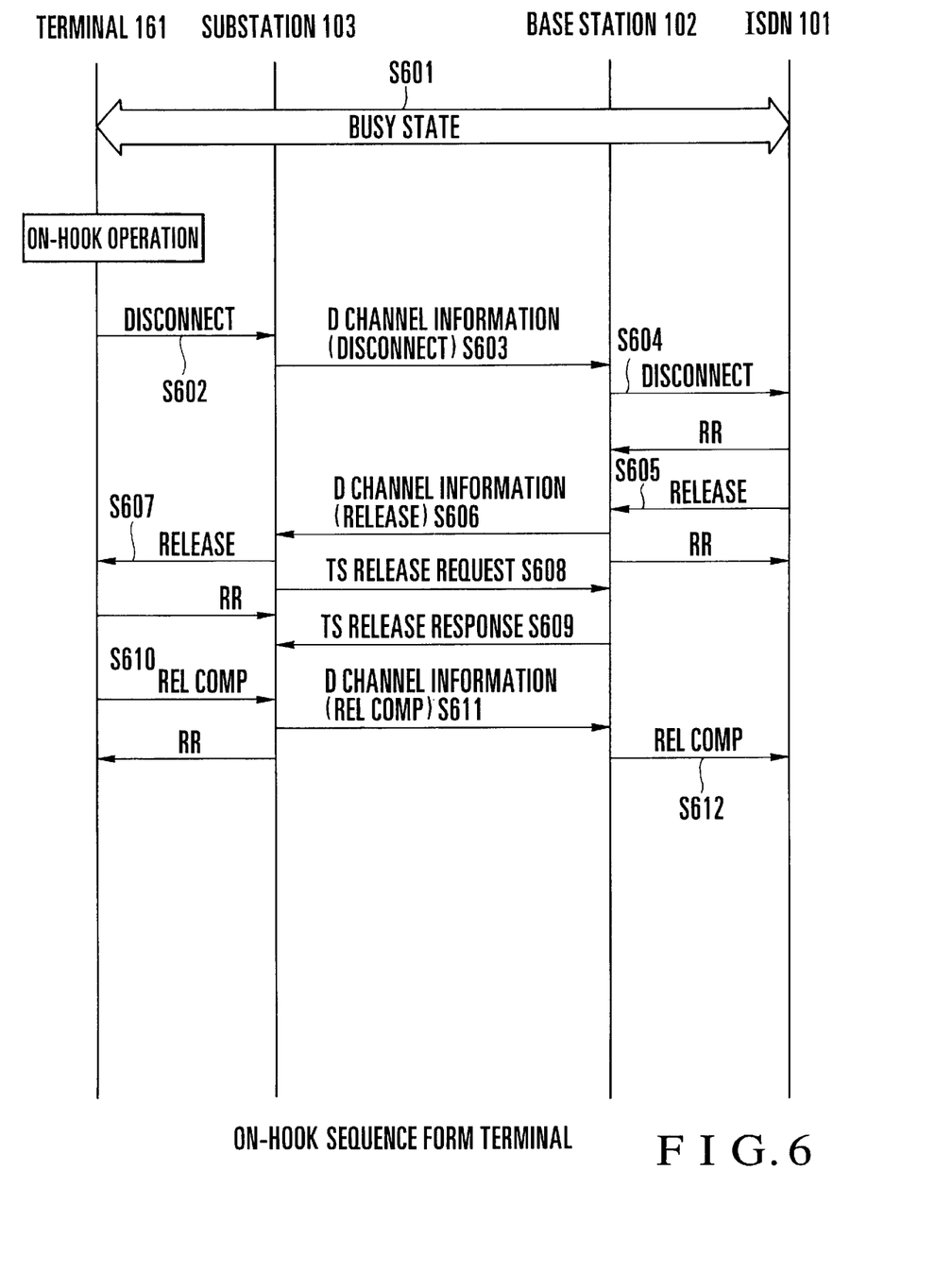
FIG. 6 is a sequence diagram showing line disconnection upon on-hook operation from the terminal side in the system shown in FIG. 2.

A sequence to be executed when on-hook operation of the terminal 161 accommodated in the substation 103 in the busy state will be described with reference to FIG. 6. When the busy state is set (step S601), the base station 102 and the substation 103 transmit/receive layer 3 messages between the ISDN 101 and the terminal 161 by frame relay. At the same time, the call state recognition circuit 133 of the substation 103 monitors a RELEASE message as a layer 3 message which indicates on-hook operation for an ISDN call. When the RELEASE message is detected in the layer 3 message received from the terminal 161 or the D channel information received from the base station 102, processing for releasing the time slot slots (TSs) between the base station 102 and the substation 103 is performed.

When the on-hook operation of the terminal 161 is performed in the busy state, a DISCONNECT message is transmitted from the terminal 161 to the ISDN 101 through the substation 103 and the base station 102 (steps S602 to S604). Upon reception of the DISCONNECT message, the ISDN 101 returns a RELEASE message to the base station 102 (step S605). This RELEASE message is transmitted as D channel information from the base station 102 to the substation 103 (step S606).

Upon detection of the RELEASE message in the D channel information from the base station 102, the call state recognition circuit 133 of the substation 103 transmits the RELEASE message to the terminal 161 (step S607). At the same time, the call state recognition circuit 133 transmits a TS release request to the base station 102 through the C channel 100 to release the time slot (TS) used for the B channel (step S608).

Upon reception of the TS release request, the channel control circuit 124 of the base station 102 rewrites the TS state in the call state recognition circuit 123 into the available state. The channel control circuit 124 then transmits a TS release response to the substation 103 (step S609) to complete the release of the D and B channel TSs. Thereafter, a REL COMP message is transmitted from the terminal 161 to the substation 103 (step S610). This message is transmitted from the substation 103 to the ISDN 101 through the base station 102 by using the C channel 100 (steps S611 and S612). When the ISDN 101 receives the REL COMP message from the base station 102, the on-hook operation for the ISDN call is complete.

Figure 7:
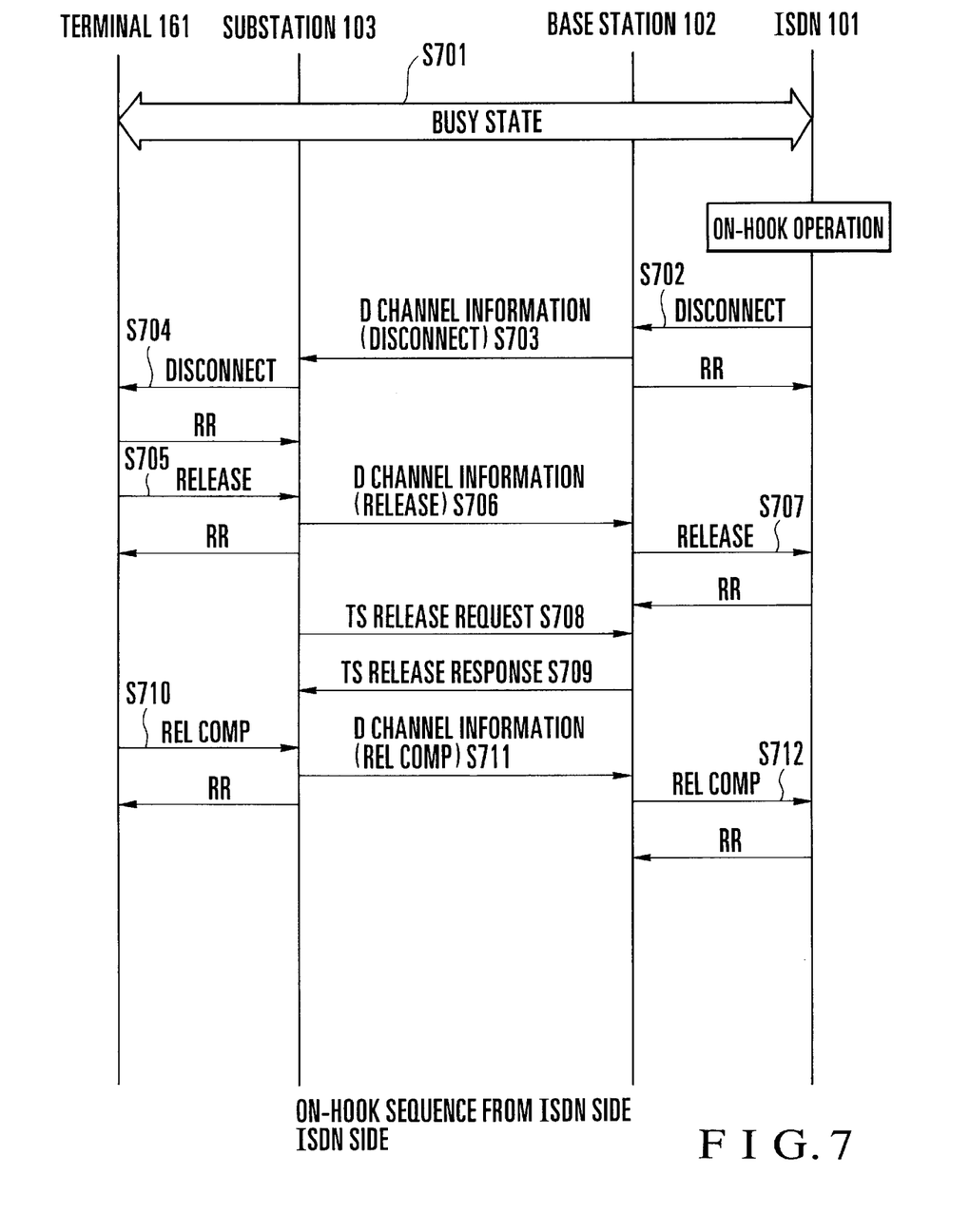
FIG. 7 is a sequence diagram showing line disconnection upon on-hook operation from the ISDN side in the system shown in FIG. 2.

FIG. 7 shows a line disconnection sequence to be executed when an on-hook operation is performed from the ISDN 101 side. In the busy state (step S701), when the other party of the terminal 161 performs an on-hook operation, a DISCONNECT message is transmitted from the ISDN 101 to the terminal 161 through the base station 102 and the substation 103 (steps S702, S703, and S704). Upon reception of the DISCONNECT message, the terminal 161 returns a RELEASE message to the substation 103 (step S705).

Upon detection of the RELEASE message from the terminal 161, the call state recognition circuit 133 of the substation 103 transmits D channel information containing the RELEASE message to the base station 102 (step S706). At the same time, the call state recognition circuit 133 transmits a TS release request to the base station 102 through the C channel 100 to release the time slot (TS) used for the B channel (step S708).

The base station 102 transmits the RELEASE message in the received D channel information to the ISDN 101 (step S707). Upon detection of the TS release request, the channel control circuit 124 rewrites the TS state in the call state recognition circuit 123 into the available state, and transmits a TS release response to the substation 103 (step S709). With this operation, the release of the D and B channel TSs is complete.

After this operation, the terminal 161 transmits a REL COMP message to the ISDN 101 through the substation 103 and the base station 102 (steps S710, S711, and S712). When the ISDN 101 receives the REL COMP message from the base station 102, the on-hook operation for the ISDN call is complete.

By using the methods described with reference to FIGS. 3 to 7, D and B channel communication lines can be assigned in accordance with outgoing calls from the substations 103 and 104 and incoming calls to the substations 103 and 104, and the D and B channel communication lines can be released in accordance with the on-hook operation. That is, a limited number of time slots (TSs) can be shared among the terminals 161, 162, and 163, thus greatly improving the frequency use efficiency as compared with the conventional ISDN servicing method. In addition, this system can easily cope with an increase in the number of subscribers.

The second embodiment of the present invention will be described next with reference to FIG. 2.

Referring to FIG. 2, a base station 102 directly monitors the layer 3 message received from an ISDN 101 to start D and B channel TS assignment/release processing. Since the layer 3 message from a terminal 161 is monitored by a substation 103, the signal processing load can be distributed to the base station 102 and the substation 103, as in the first embodiment. This scheme is effective for a system with a high traffic.

Figure 8:
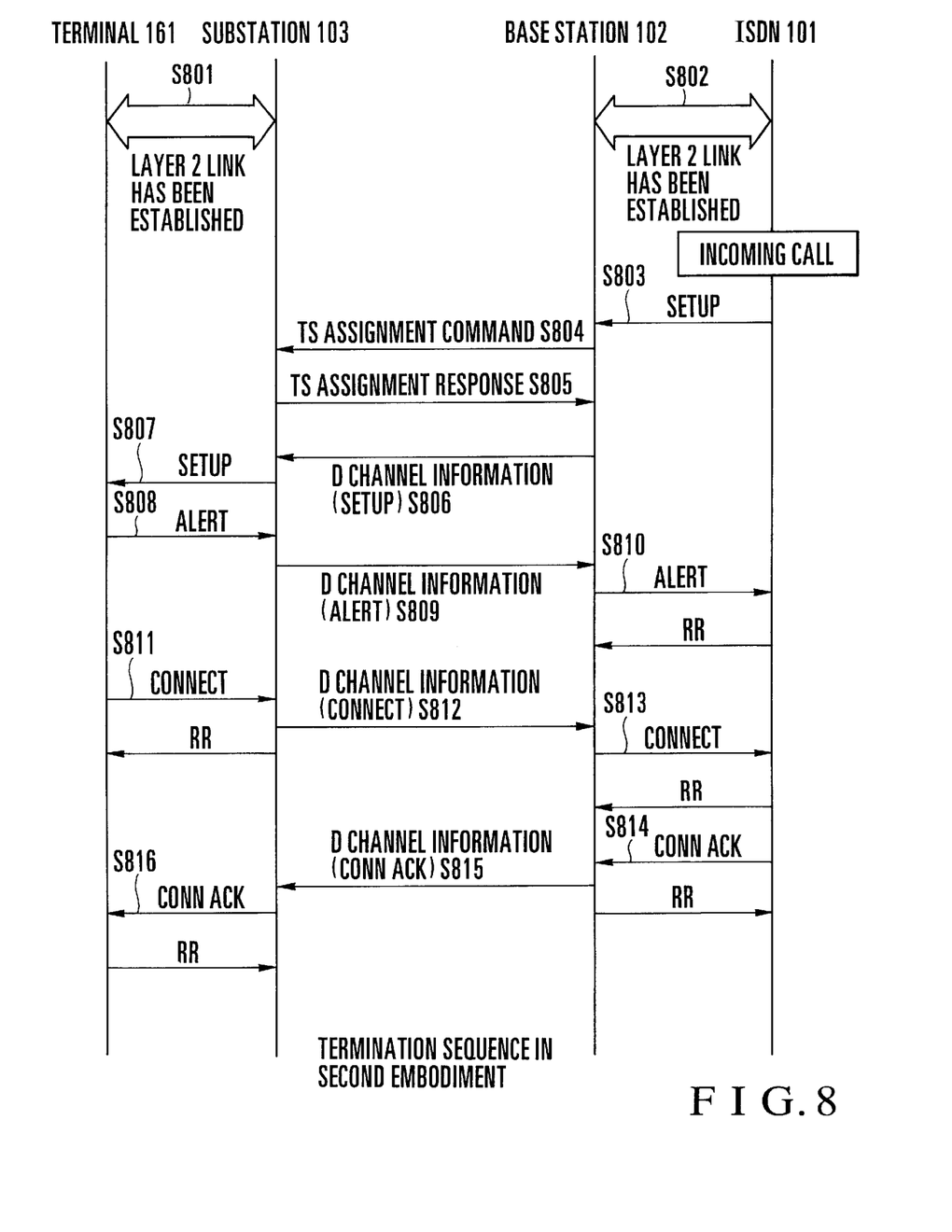
FIG. 8 is a sequence diagram showing line connection upon termination from the ISDN side in a communication system according to the second embodiment of the present invention.

FIG. 8 shows a termination sequence to be executed when the terminal 161 receives an incoming call from the ISDN 101 in the second embodiment. This sequence will be described in comparison with the termination sequence diagram of FIG. 5 in the first embodiment.

Layer 2 links have already been established between the terminal 161 and the substation 103 and between the base station 102 and the ISDN 101 by layer line establishment sequence (1) (steps S801 and S802). According to the sequence shown in FIG. 5, upon reception of the SETUP message from the ISDN 101, the base station 102 transmits the SETUP message as D channel information to the substation 103, and the substation 103 analyzes the SETUP message. In contrast to this, according to the sequence shown in FIG. 8, after the call state recognition circuit 123 of the base station 102 directly analyzes the SETUP message from the ISDN 101, the channel control circuit 124 determines a time slot (TS) to be assigned.

The channel control circuit 124 of the base station 102 transmits a TS assignment command based on the analysis result to the substation 103 (step S804). In response to this command, the substation 103 returns a TS assignment response to the base station 102 (step S805). Thereafter, the base station 102 converts the SETUP message received from the ISDN 101 into a message to be transmitted between the substation and the base station, and transmits it as D channel information to the substation 103 through a C channel 100 (step S806). Since subsequent steps S807 to S816 are the same as steps S507 to S516 in FIG. 5, a description thereof will be omitted.

According to this embodiment, the processing to be executed in the substation 103 can be reduced, and the processing speed increases accordingly.

As has been described above, according to the present invention, since communication line assignment between the base station and the substations is realized by the demand-assignment scheme, the communication lines between the base station and the substations can be effectively used. Therefore, the line use efficiency can be improved, and the number of subscribers can be greatly increased.

What is claimed is:

1. A multi-directional multiplex communication system comprising a base station connected to an Integrated Services Digital Network (ISDN) and at least one substation having a plurality of terminals connected thereto and serving to communicate with said base station through a radio channel;

said substation including a first layer 1 terminating circuit and a first layer 2 terminating circuit for respectively terminating layer 1 and layer 2 with respect to said plurality of terminals; and said base station comprising:
a second layer 1 terminating circuit and a second layer 2 terminating circuit for respectively terminating layer 1 and layer 2 with respect to said ISDN;
channel control means for transmission channel assignment/release between said base station and said substation by a demand-assignment scheme in accordance with generation/end of a call; and
a channel management table,
wherein said channel control means performs transmission channel assignment/release by looking up said channel management table upon generation/end of a call, and rewrites portions of said channel management table.

2. A system according to claim 1, wherein said system further comprises call state recognition means for recognizing generation/end of a call by monitoring layer 3 messages exchanged between said plurality of terminals and said ISDN, and outputting a transmission channel assignment/release request; and said channel control means performs transmission channel assignment/release on the basis of the assignment/release request from said call state recognition means.

3. A system according to claim 2, wherein said call state recognition means is arranged in said substation to monitor a layer 3 message; and said channel control means performs transmission channel assignment/release on the basis of the assignment/release request sent from said substation.

4. A system according to claim 2, wherein said call state recognition means is arranged in said substation to monitor a layer 3 message; and said channel control means performs transmission channel assignment/release on the basis of an assignment/release request generated in said base station.

5. A system according to claim 2, wherein said call station recognition means is arranged in each of said substation and said base station to monitor layer 3 messages from said plurality of terminals and said ISDN; and said channel control means performs transmission channel assignment/release on the basis of the assignment/release request sent from said substation and the assignment/release request generated in said base station.

6. An Integrated Services Digital Network (ISDN) servicing method in a multi-directional multiplex communication system comprising a base station connected to an ISDN and at least one substation having a plurality of terminals connected thereto and serving to communicate with said base station through a radio channel, comprising:

causing said base station to terminate up to layer 2 with respect to said ISDN and causing said substation to terminate up to layer 2 with respect to an ISDN terminal;

recognizing generation/end of a call by monitoring a layer 3 message exchanged between said ISDN terminal and said ISDN; and performing transmission channel assignment/release between said base station and said substation by a demand-assignment scheme in accordance with generation/end of a call, wherein performing transmission channel assignment/release comprises:
looking up a channel management table in said base station upon generation/end of a call; and
rewriting portions of said channel management table.

7. A method according to claim 6, wherein said recognizing comprises:

causing said substation to recognize generation/end of a call by monitoring-a layer 3 message; and transmitting the recognition result from said substation to said base station, and wherein said performing transmission channel assignment/release comprises causing said base station to perform transmission channel assignment/release on the basis of the received recognition result.

8. A method according to claim 6, wherein said recognizing comprises causing said base station to recognize generation/end of a call by monitoring a layer 3 message, and wherein said performing transmission channel assignment/release comprises causing said base station to perform transmission channel assignment/release on the basis of the recognition result obtained in said base station.

9. A method according to claim 6, wherein said recognizing comprises:

causing said substation and said base station to recognize generation/end of a call by monitoring a layer 3 message exchanged between said ISDN terminal and said ISDN; and transmitting the recognition result from said substation to said base station, and wherein said performing transmission channel assignment/release comprises causing said base station to perform transmission channel assignment/release on the basis of the received recognition result and the recognition result obtained in said base station.

* * * * *